(12) United States Patent
Temudo de Castro et al.

(10) Patent No.: US 6,947,386 B2
(45) Date of Patent: Sep. 20, 2005

(54) PRACTICAL NETWORK NODE COORDINATE ESTIMATION

(75) Inventors: Miguel Oom Temudo de Castro, Cambridge (GB); Manuel Silverio da Silva Costa, Cambridge (GB); Peter B. Key, Cambridge (GB); Antony Rowstron, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 62 days.

(21) Appl. No.: 10/454,411

(22) Filed: Jun. 4, 2003

(65) Prior Publication Data

US 2004/0109417 A1 Jun. 10, 2004

Related U.S. Application Data

(60) Provisional application No. 60/431,470, filed on Dec. 6, 2002.

(51) Int. Cl.[7] .............................................. H01L 12/28
(52) U.S. Cl. ...................................... 370/238; 370/255
(58) Field of Search .................................. 370/238, 254, 370/255, 256, 351, 392, 400; 701/201, 208, 209, 213

(56) References Cited

U.S. PATENT DOCUMENTS 5,115,433 A * 5/1992 Baran et al. ................. 370/400

OTHER PUBLICATIONS

Zhang, Predicting Internet Network Distance with Coordinates Based Approaches, ACM SIGMETRICES Performance Evaluation Review archive V30 Issue 2 Sep. 2002, 10 pgs.*

* cited by examiner

Primary Examiner—Chau Nguyen
Assistant Examiner—Robert W. Wilson
(74) Attorney, Agent, or Firm—Lee & Hayes PLLC

(57) ABSTRACT

Substantially accurate estimation of coordinates of a subject network node in a coordinate space is accomplished by considering designated coordinates of other positioned nodes within the network. The designation of coordinates in the coordinate space to such nodes allows the computation of predicted coordinate distances between two network nodes based on the coordinates. By optimizing the network distance errors between measured distances and predicted coordinate distances, the predicted coordinates of a subject node joining the network can be iteratively refined. With these estimated coordinates, the coordinate distance between two points in the space may be computed as a prediction of the network distance between the two corresponding nodes. Furthermore, coordinate-based coordinate estimation lends itself to security precautions to protect against malicious reference nodes or external interference.

31 Claims, 11 Drawing Sheets

PRACTICAL NETWORK NODE COORDINATE ESTIMATION

RELATED APPLICATIONS

This application claims benefit of U.S. Provisional Application No. 60/431,470, filed Dec. 6, 2002 and entitled "Peer-to-Peer Network Distance Estimation", specifically incorporated by reference for all that it disclosed and teaches.

TECHNICAL FIELD

The invention relates generally to communication networks, and more particularly to estimating coordinates of a node in a network.

DESCRIPTION

In many network or distributed applications, it is helpful to determine the network distance between two different network nodes. Generally, there are several ways to define a network distance, including without limitation a round-trip delay, a bandwidth characteristic, and/or a number of hops among intermediate nodes to reach the destination. Knowledge of a network distance between two nodes may be used, for example, when building a peer-to-peer network overlay. In addition, peer-to-peer applications, such as file sharing, can benefit greatly from using overlays that are optimized using estimated network distances between source and destination nodes.

However, existing approaches for measuring network distances require a dedicated infrastructure of landmark nodes within the network or an excessive amount of communication (e.g. "pings" or "probes") to determine the network distance between two nodes. Moreover, neither of these existing approaches scales well as the network changes and churns.

Implementations described and claimed herein solve the discussed problems by assigning a point in a coordinate space (e.g., a metric or topological space) to nodes in a network. A measured network distance may be measured (e.g., by measuring round trip time) between a subject network node and another node that already has designated coordinates. By considering the network distance error between the measured network distance and a predicted coordinate distance, the estimated coordinates of a subject network node can be refined to the point of acceptable accuracy. The assignment of coordinates in the coordinate space to such nodes thereby allows the computation of predicted coordinate distances between two network nodes based on the estimated coordinates of each node.

In a d-dimensional coordinate space, optimizing the estimated coordinates of the subject network node using the provided coordinates of at least d+1 reference nodes can yield a substantially accurate estimate of the subject node's coordinates. For these estimated coordinates, the coordinate distance between two points (e.g., corresponding to network nodes) in the space may be computed as a prediction of the network distance between the two nodes. Furthermore, such coordinate-based estimation lends itself to security precautions to protect against malicious reference nodes or external interference.

In various implementations, articles of manufacture are provided as computer program products. One implementation of a computer program product provides a computer program storage medium readable by a computer system and encoding a computer program that estimates network node coordinates. Another implementation of a computer program product may be provided in a computer data signal embodied in a carrier wave by a computing system and encoding the computer program that estimates network node coordinates.

The computer program product encodes a computer program for executing on a computer system a computer process for estimating network node coordinates. Measured network distances are measured between a subject node and each reference node of a plurality of reference nodes selected from a network. At least one reference node is randomly selected from the network. Each reference node is designated by coordinates in a coordinate space. Coordinates in the coordinate space are computed for the subject node based on the measured network distances and the coordinates for each of the reference nodes.

In another implementation, a method of estimating network node coordinates is provided. Measured network distances are measured between a subject node and each reference node of a plurality of reference nodes selected from a network. At least one reference node is randomly selected from the network. Each reference node is designated by coordinates in a coordinate space. Coordinates in the coordinate space are computed for the subject node based on the measured network distances and the coordinates for each of the reference nodes.

In yet another implementation, a system for estimating network node coordinates is provided. A network distance module measures measured network distances between a subject node and each reference node of a plurality of reference nodes selected from a network. At least one reference node is randomly selected from the network. Each reference node is designated by coordinates in a coordinate space. A coordinate estimation module computes coordinates in the coordinate space for the subject node based on the measured network distances and the coordinates for each of the reference nodes.

Other implementations are described and claimed herein.

BRIEF DESCRIPTIONS OF THE DRAWINGS INCLUDED HEREIN ARE LISTED BELOW

A measure of "network distance" is useful in many applications, including distributed content hosting servers, content addressable overlay networks and peer-to-peer file sharing. For example, if a first network node attempts to download streaming video, it is likely that the best performance may be obtained from the nearest network node that is capable of providing that streaming video.

To estimate a network distance between a source and destination node, one or more nodes in a network may be characterized as points in a coordinate space (e.g., a d-dimensional Euclidean space) using multidimensional scaling techniques, such that estimated coordinates are assigned to each network node. Accordingly, because the network nodes can be mapped into this coordinate space, a coordinate distance between two points (e.g., nodes) in the space may also be used as an estimate of the corresponding network distance.

The number of dimensions d required to adequately represent the substantially accurate network distances depends on the problem space. In general, the higher the number of dimensions, the greater the accuracy of the mapping, but the more cumbersome the mapping. However, beyond a certain point, there is typically a point of diminishing returns, where adding extra dimensions adds little to the prediction accuracy.

The number of dimensions may be chosen in advance or may be chosen automatically by the insertion algorithm that inserts a subject network node into the set of network nodes having designated coordinates. Such network nodes are called "positioned nodes". Informally, the number of dimensions is related to the dimensions of the distance matrix. That is, if the distance matrix is a "true" distance matrix, such that all distances satisfy the triangle inequality, then the number of dimensions d is the (matrix) rank of the transform of the distance matrix. In typical scenarios, d may be of the order of about 10, although no formal minimum or maximum has been set. Empirical data has shown good accuracy estimation for $d \geq 8$ and little benefit for $d \geq 12$, although dimensions outside this range are contemplated.

Figure 1:
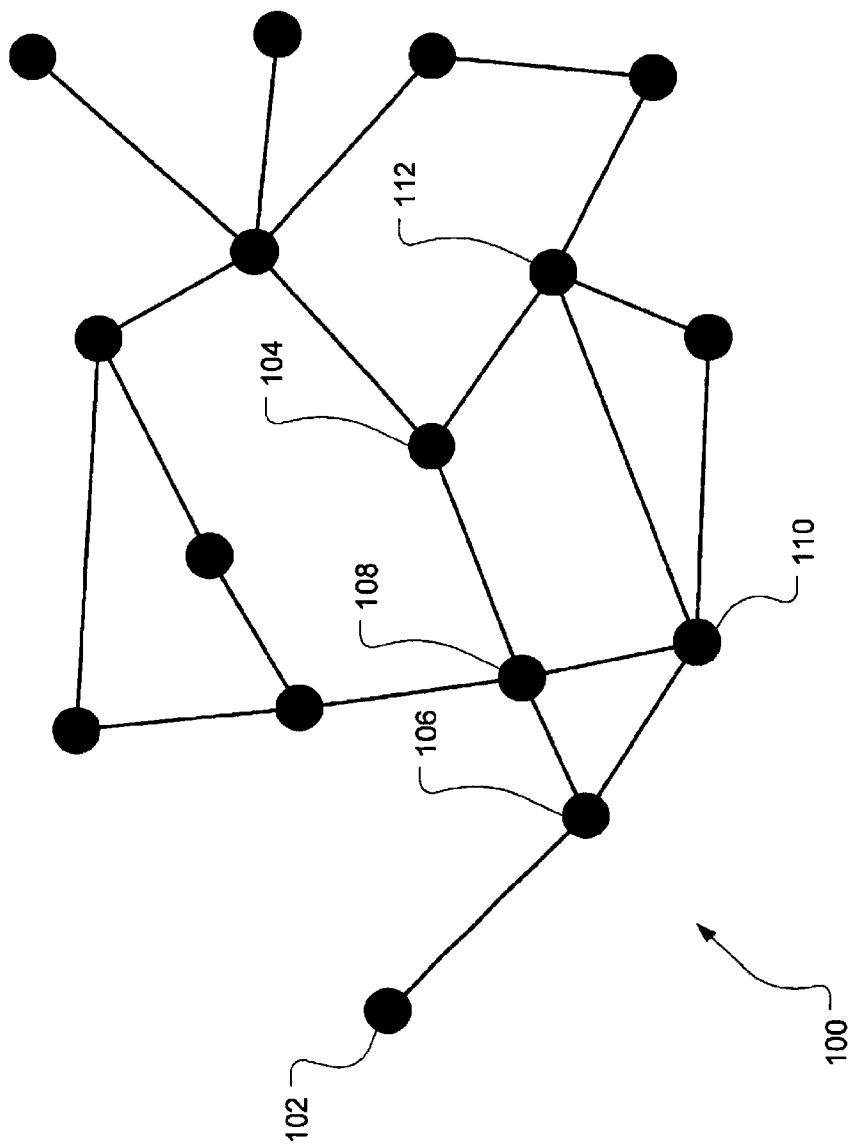
FIG. 1 illustrates a schematic of an exemplary network.

FIG. 1 illustrates a schematic of an exemplary network 100. Network nodes, such as a node 102, represent hardware and/or software logically interconnected with other network nodes. The network nodes support a shared set of protocols to allow communications among each of the network nodes. The exemplary network 100 may represent a large network, such as the Internet, in which each network node is logically part of the network and can participate in the network communications as a source, a destination, or an intermediary. It should be understood, however, that a particular size is not a specific constraint of the illustrated network 100.

Selected network nodes, referred to as "positioned nodes" in the network 100, have been designated with coordinates in the coordinate space. A source network node originates transmission of a message through the network toward a destination node. In addition, for some messages, an intermediary node can receive the message and forward it toward the destination node. For example, if the source node 102 transmits a message to a destination node 104, the message may physically pass through intermediary nodes 106 and 108. Alternatively, the message may pass through a different network path, such as through intermediary nodes 106, 110, and 112, to arrive at the destination node 104. Which of these different paths are used for communication of a given message between source and destination nodes may be influenced by various characteristics of the network, including without limitation the available bandwidth between the various nodes, the routing algorithm at each node, and the load being experienced at each node.

It should be understood that the network distances between given network nodes can change, such as with the insertion of a new node to the network or the removal of a node from the network. Furthermore, other events can impact network distance between nodes, such as loss or addition of other network segments, significant changes in network bandwidth in certain segments, etc.

It should also be understood that, in various application, it may be useful for a given network node to determine the network distance between it and another network node, such as to determine the nearest network node capable of providing desired streaming data. Likewise, it may also be useful for a given network node to determine the network distance between any two other network nodes, such as to develop a peer-to-peer network overlay. By estimating network node coordinates as described herein, estimated network distances between any two positioned nodes may be calculated from the coordinates of the nodes.

Figure 2:
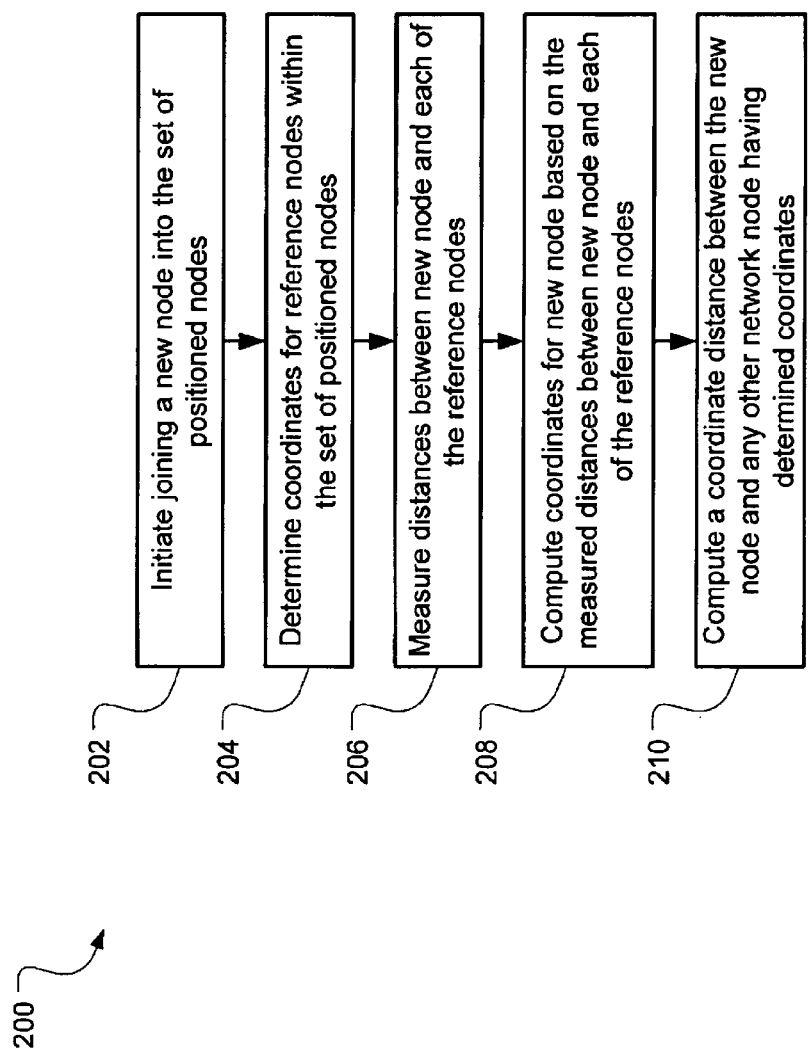
FIG. 2 illustrates operations for an exemplary method of estimating network node coordinates.

FIG. 2 illustrates operations for an exemplary method 200 of estimating node coordinates. In an initiating operation 202, a new node n initiates the process of joining a set of P positioned nodes. For example, the new node n may determine that it needs designated coordinates to service an application or to participate in a given network operation, such as building a peer-to-peer overlay. A node attempting to join the set of P positioned nodes is referred to as a "subject node".

A coordinate operation 204 determines the coordinates of a subset of L reference nodes within the set of P positioned nodes. If the coordinate space is a d-dimensional space, then the subset of reference nodes has size $L \geq d+1$. The selection of which reference nodes are included in this subset L may be made entirely or partially at random within the set P of positioned nodes. That is, it is unnecessary to determine the coordinates and/or identifications of special predefined landmark nodes. Likewise, it is unnecessary to "ping" or probe a great multitude of network nodes in order to determine the members of the subset L. Furthermore, various exemplary modes for selecting the members of the subset L—random, close, and hybrid—are described later in this description.

In one implementation, the coordinates of these reference nodes have been previously estimated and stored in a storage location from which they can be transmitted to the subject node n or to any other node that is capable of performing the network node coordinate estimation process. For example, the subject node can perform the entire computation or another node can perform the computation in cooperation with the subject node. In an alternative implementation, the coordinates of these positioned nodes may be previously or dynamically computed in accordance with the method described herein or using any coordinate designation method. Generally, the selection of which positioned nodes are included in the set of reference nodes for any given subject node maintains some form of randomness.

A network distance operation 206 measures the network distances between the subject node and each of the reference nodes in L. In one implementation, the round-trip delay time may be determined to represent network distance using an average of ICMP (Internet Control Message Protocol) ping response times, although other methods of measuring network distance may be employed, including measuring round-trip delay using application-level probes, counting hops between the source and destination nodes using network or operating system utilities (such as traceroute, which gives the path from the source to the destination), making a determination of network congestion along the segments connecting the source and destination nodes, measuring the bandwidth between the source and the destination nodes using inference from probes, such as packet pair, etc. The distance itself could also be multidimensional, for example, representing both delay and number of hops, etc.

A coordinate estimating operation 208 computes the coordinates of the subject node based on the measured network distances between the subject node and each of the reference nodes. In one implementation, a multi-dimensional global optimization algorithm (such as simplex downhill, controlled random search, simulated annealing, etc.) is performed to compute the coordinates for the subject node.

The optimization algorithm starts with an initial prediction of the coordinates of the subject node. In various implementations, this initial prediction may be random, may be based on previous estimates (e.g., for nodes having their coordinates re-estimated), may be part of the algorithm used to calculate the coordinates, etc. Coordinate distances are computed between the initial prediction of the subject node's coordinates and the coordinates of each of the reference nodes. Thereafter, the errors between the measured network distances (determined in measuring operation 206) and the computed coordinate distances are then calculated. The errors may be represented by various target error functions, including without limitation the sum of squares relative errors:

$$\varepsilon = \sum_{i=1}^{|L|} \left( \frac{(d_i^m - d_i^p)}{d_i^m} \right)^2 \quad (1)$$

where $d_i^m$ represents the distance measured between the subject node and the $i^{th}$ node in L and $d_i^p$ represents the coordinate distance (i.e., the predicted coordinate distance) computed between the predicted coordinates of the subject node and the coordinates of the $i^{th}$ node in L.

After this first pass, the optimization algorithm determines a new prediction of the subject node coordinates, based on the specific characteristics of the chosen optimization algorithm. New coordinate distances are computed based on these new predicted coordinates, and the errors between the measured network distances and the newly computed coordinate distances are re-calculated. The optimization algorithm iterates to find the optimal coordinates of the subject node that minimize the error between the measured network distances and the computed coordinate distances.

It should be understood that other methods of computing the subject node coordinates, including using geometric properties of the space to affect the calculation, are also contemplated. Eventually, the error between the measured network distances and the computed coordinate distances decreases within an acceptable range, such that the final predicted coordinates are deemed the estimated coordinates of the subject node.

A network distance estimation operation 210 computes the coordinate distance between the subject node and any other network node that has already had its coordinates determined, based on the coordinates of the subject node and the coordinates of the other node. The computed coordinate distance is deemed the estimated network distance between the two nodes. The nature of the computed coordinate distance depends on the network distance measure or metric associated with the d dimensional space. For example, in the case that the d dimensional space is Euclidean, the natural Euclidean distance may be used, namely, the square root of the sum of the squared differences of the d coordinates of the two nodes.

Figure 3:
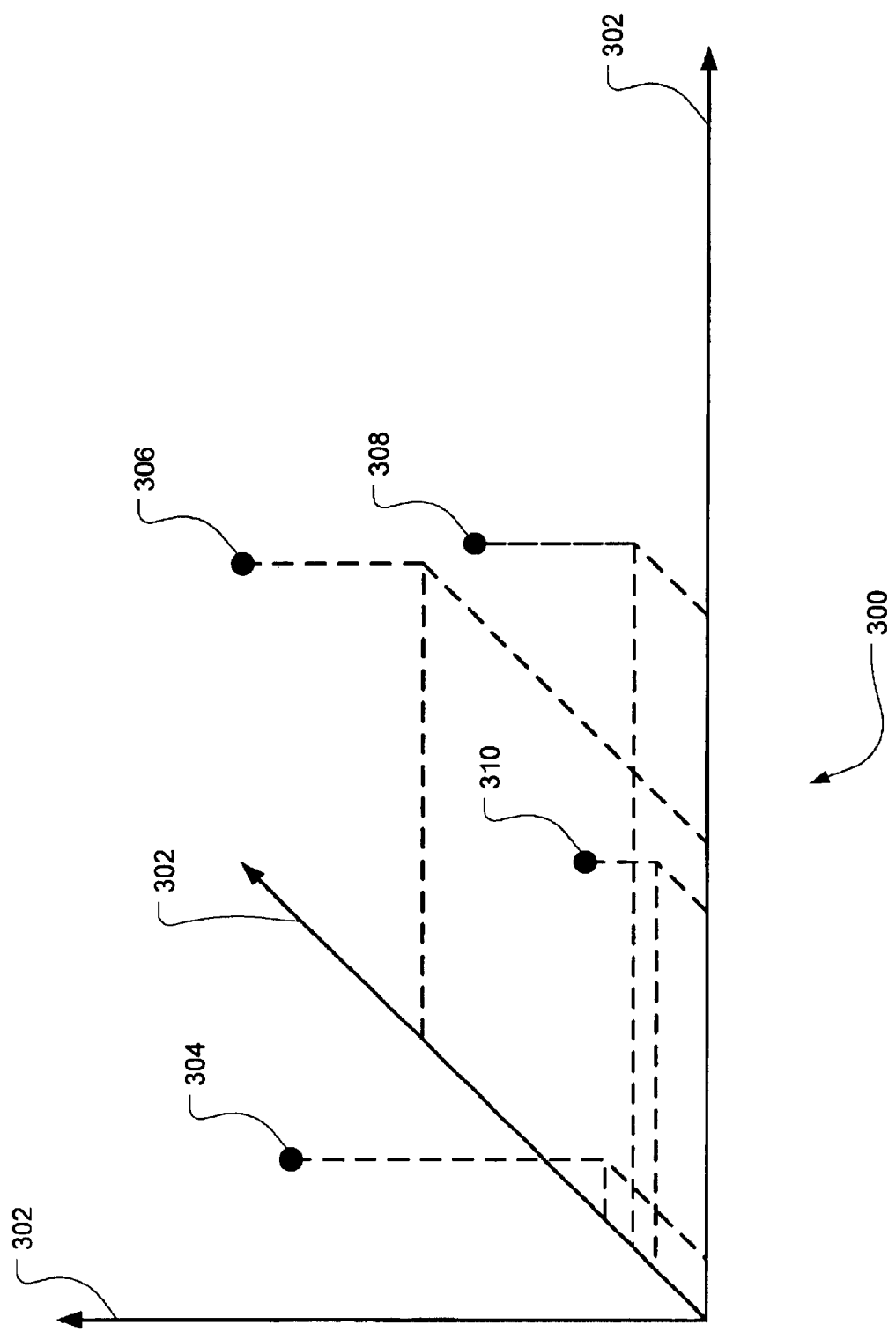
FIG. 3 illustrates four reference nodes randomly selected within a network and mapped into a 3-dimensional coordinate space.

FIG. 3 illustrates four reference nodes randomly (or partially randomly) selected within a network and mapped into a 3-dimensional coordinate space 300. It should be understood that a coordinate space with greater or fewer than three dimensions is also contemplated. In one implementation, for example, an 8-dimensional coordinate space is employed. However, a 3-dimensional coordinate space 300 is illustrated to clearly illustrate the principle.

The illustrated coordinate space 300 is defined by three axes 302. The reference nodes 304, 306, 308, and 310 are selected and are defined as having coordinates locating them at the illustrated locations in the coordinate space 300.

Figure 4:
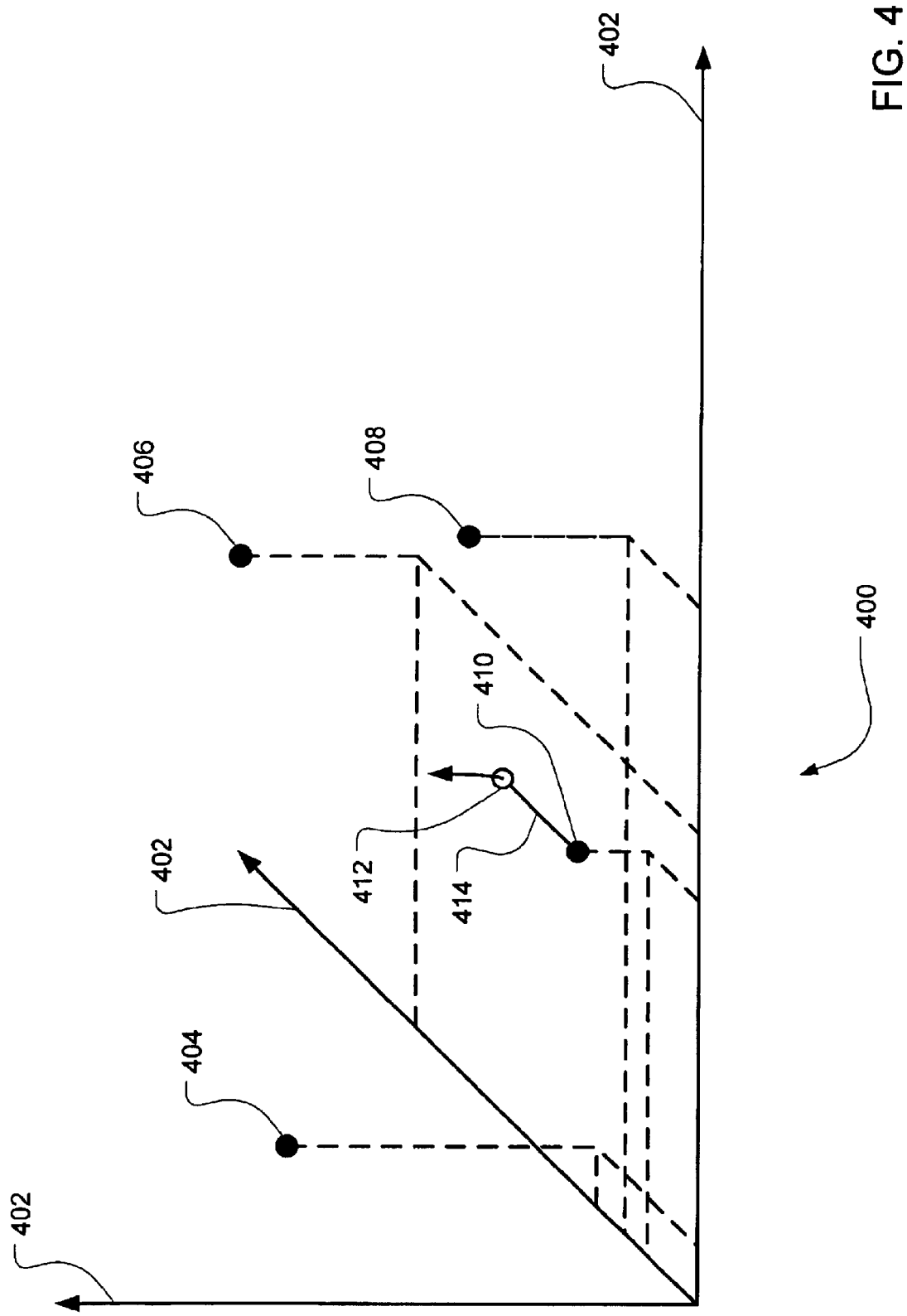
FIG. 4 illustrates a subject node at a tentative location based on a measured network distance from one of the four reference nodes.

FIG. 4 illustrates a subject node at a tentative location based on a measured network distance from one of the four reference nodes. The 3-dimensional coordinate space 400 is illustrated as described in FIG. 3, with three axes 402 and four reference nodes 404, 406, 408, and 410. The network distance between the subject node 412 and the reference node 410 is measured, such as using an average of ICMP ping response times or probe results. The determined network distance represents a radius 414 around the reference node 410 in the 3-dimensional coordinate space 400.

Figure 5:
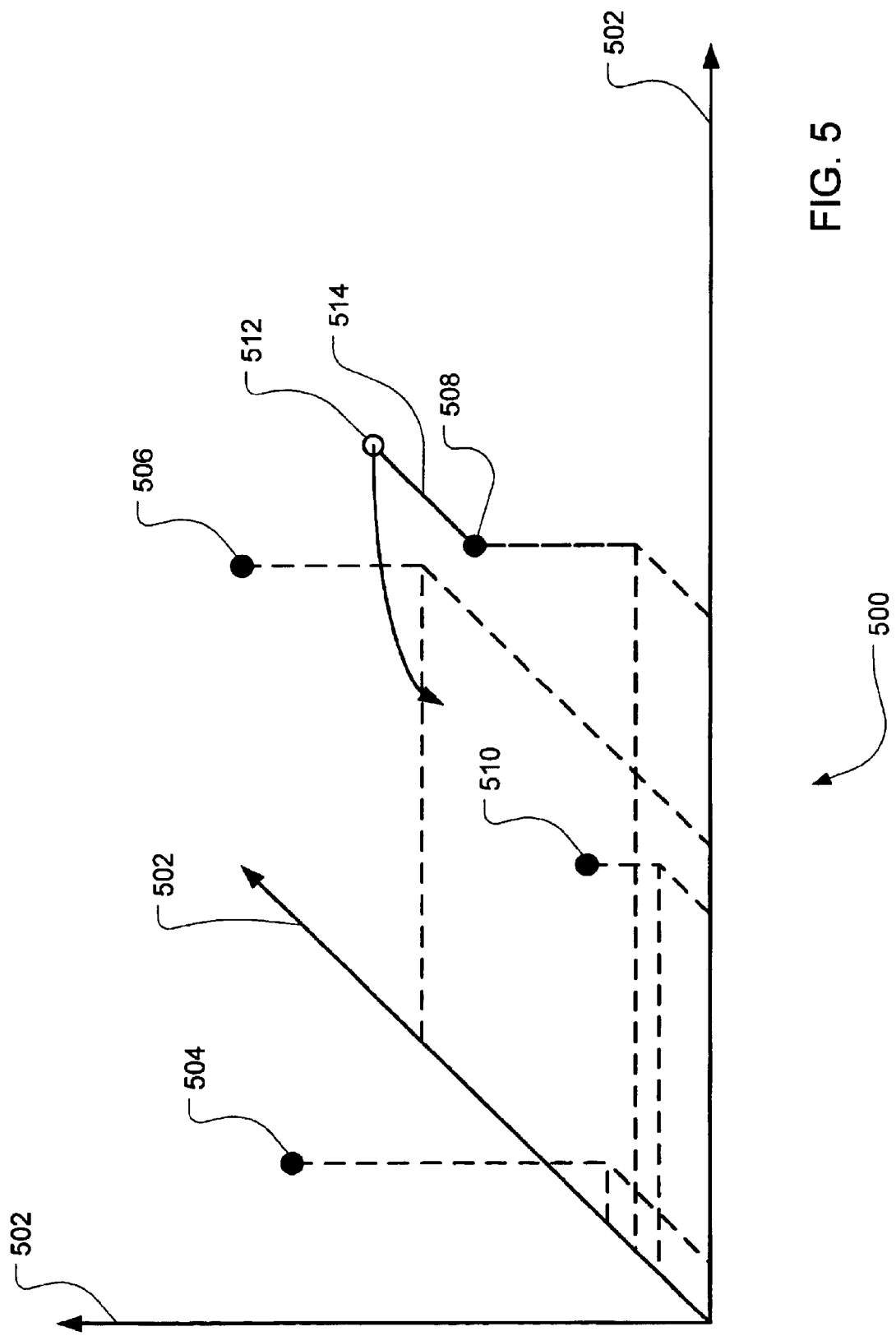
FIG. 5 illustrates a subject node at a tentative location based on a measured network distance from another one of the four reference nodes.

FIG. 5 illustrates a subject node at a tentative location based on a measured network distance from another one of the four reference nodes. The 3-dimensional coordinate space 500 is illustrated as described in FIG. 3, with three axes 502 and four reference nodes 504, 506, 508, and 510. The network distance between the subject node 512 and the reference node 508 is measured. The determined network distance represents a radius 514 around the reference node 508 in the 3-dimensional coordinate space 500.

Figure 6:
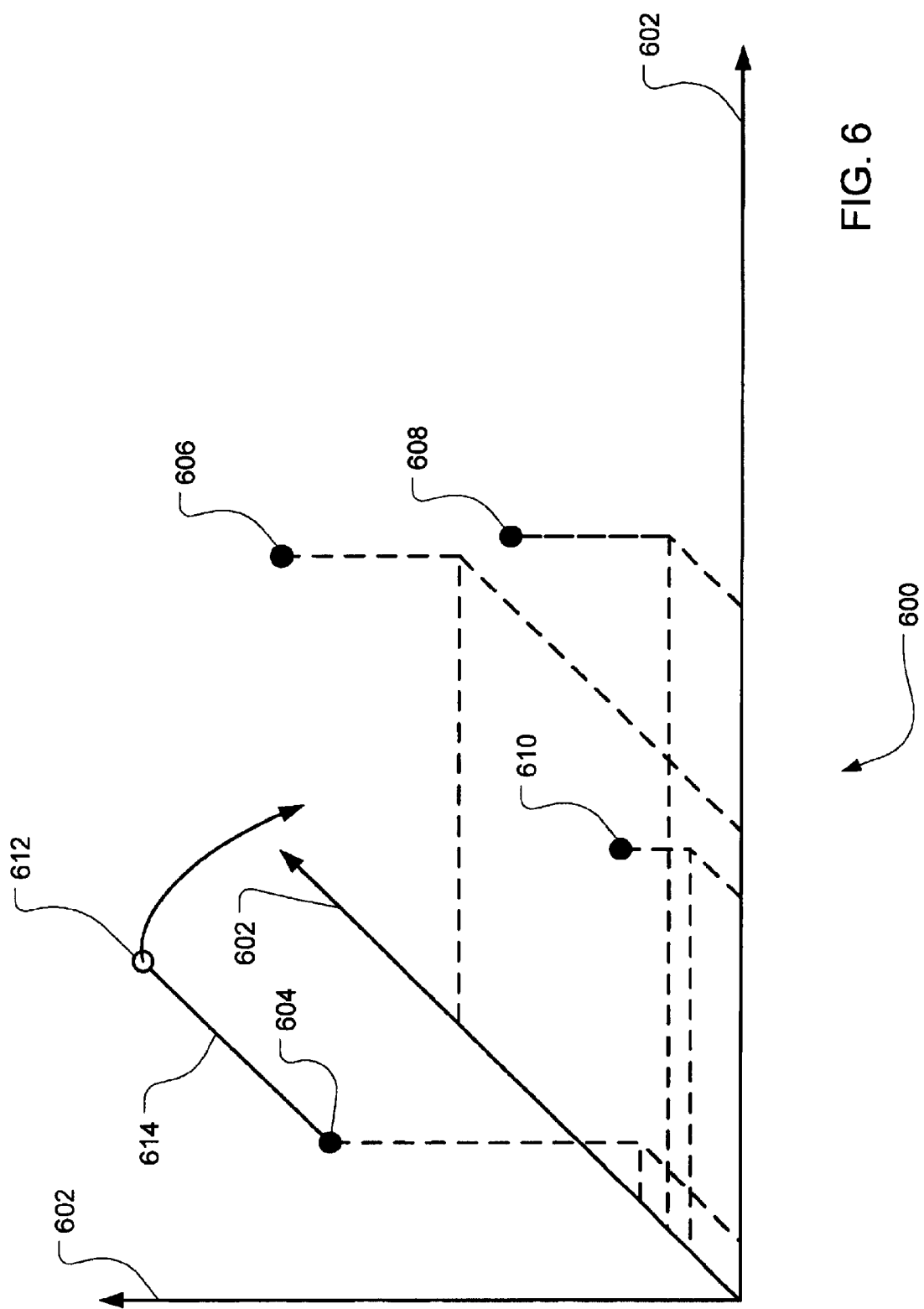
FIG. 6 illustrates a subject node at a tentative location based on a measured network distance from yet another one of the four reference nodes.

FIG. 6 illustrates a subject node at a tentative location based on a measured network distance from yet another one of the four reference nodes. The 3-dimensional coordinate space 600 is illustrated as described in FIG. 3, with three axes 602 and four reference nodes 604, 606, 608, and 610. The network distance between the subject node 612 and the reference node 604 is measured. The determined network distance represents a radius 614 around the reference node 604 in the 3-dimensional coordinate space 600.

Figure 7:
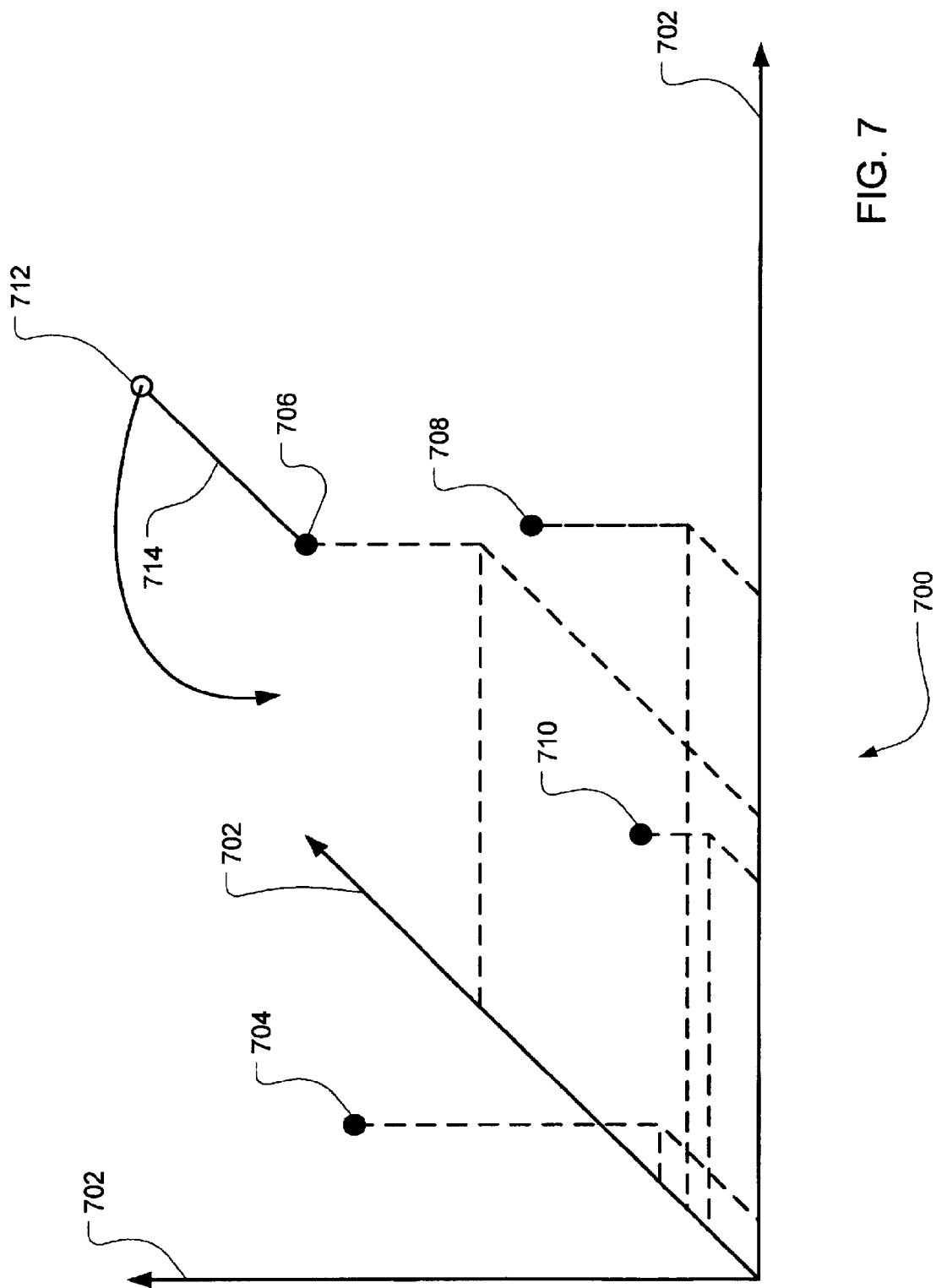
FIG. 7 illustrates a subject node at a tentative location based on a measured network distance from yet another one of the four reference nodes.

FIG. 7 illustrates a subject node at a tentative location based on a measured network distance from yet another one of the four reference nodes. The 3-dimensional coordinate space 700 is illustrated as described in FIG. 3, with three axes 702 and four reference nodes 704, 706, 708, and 710. The network distance between the subject node 712 and the reference node 706 is measured. The determined network distance represents a radius 714 around the reference node 706 in the 3-dimensional coordinate space 700.

Figure 8:
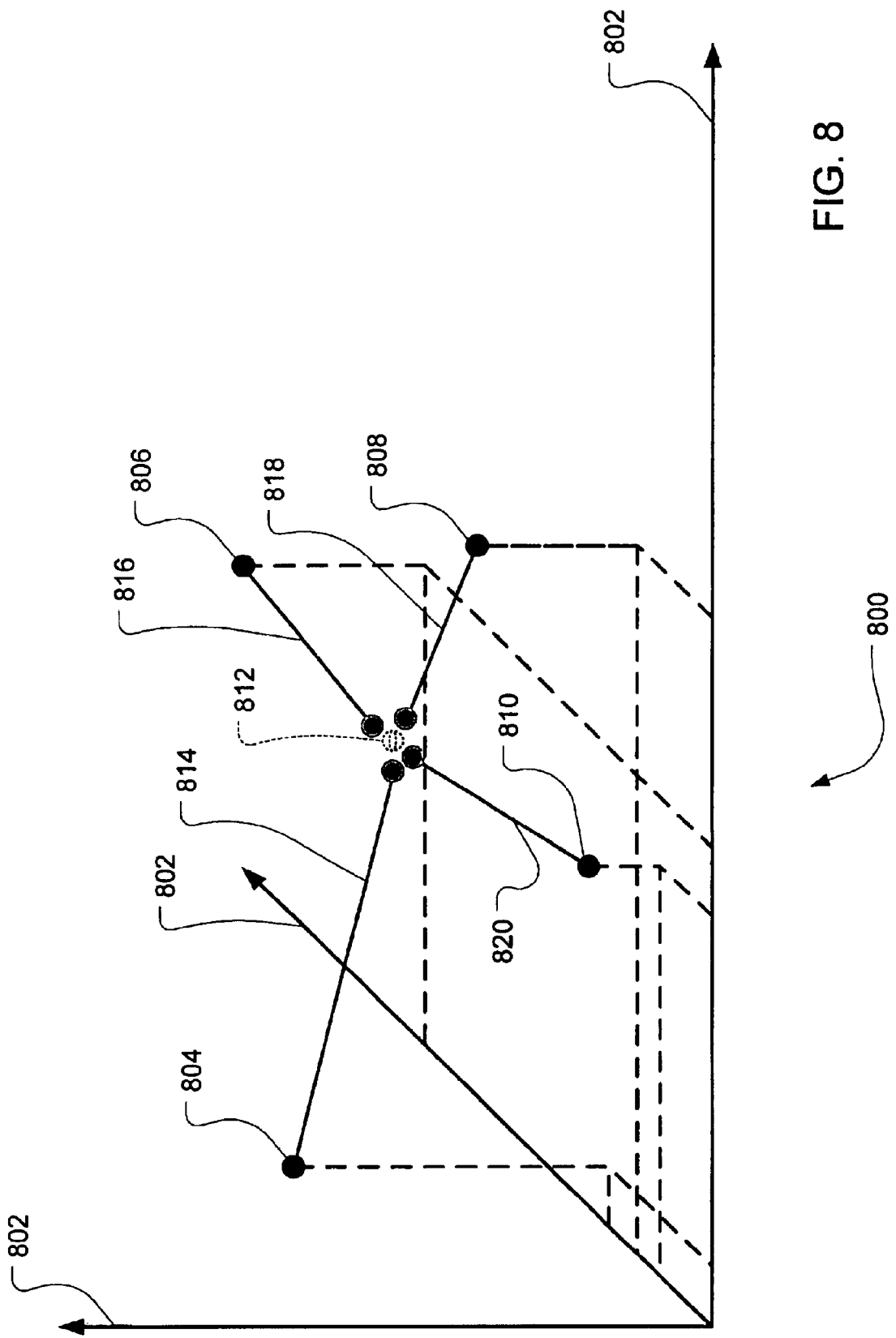
FIG. 8 illustrates a subject node at a predicted location based on the measured network distances from each of the four reference nodes.

FIG. 8 illustrates a subject node at a predicted location based on the measured network distances from each of the four reference nodes. The 3-dimensional coordinate space 800 is illustrated as described in FIG. 3, with three axes 802 and four reference nodes 804, 806, 808, and 810. In addition, a coordinate estimation module has estimated the coordinates of the subject node 812 based on the measured distances 814, 816, 818, and 820 between the subject node and each of the reference nodes 804, 806, 808, and 810. It can be seen in FIG. 8 that four (or more) reference nodes 804, 806, 808 and 810 may not define a unique intersection point (e.g., note that the endpoints of the measured distances

814, 816, 818, and 820 do not all intersect at a unique point but merely approximate such a point). That is, in a coordinate space of arbitrary dimensionality d, for example, at least d+1 reference nodes and their associated distances from the subject node may not necessarily define a unique point for the subject node in the d-dimension coordinate space. As such, the described method provides an estimate of a best fit point for the coordinates of the subject node in the d-dimension coordinate space, such as by minimizing the differences between (1) the measured network distances between the subject node 812 and each reference node, and (2) the computed network distances between the subject node 812 and each reference node, based on estimated coordinates of these nodes. In addition, given these coordinates and the coordinates of any other positioned node, the coordinate distance between the subject node and any other positioned node may be computed by the estimated coordinate network distance between the two nodes.

It should be understood that the forgoing descriptions associated with FIGS. 4, 5, 6, 7 and 8 are exemplary in nature, particularly with regard to the selection of a 3-dimensional coordinate space. It should also be understood the geometric description of FIGS. 4, 5, 6, 7, and 8 illustrates how the subject node relates to the reference nodes in the d-dimension coordinate space, not necessarily how the algorithm estimates the coordinates of the subject node.

The selection of the reference nodes within the set of positioned nodes may involve a variety of selection modes. Three exemplary selection modes that use coordinates of randomly selected reference nodes are described below:

(1) Random—Any positioned node that is capable of providing its coordinates in the coordinate space (or having those coordinates provided for it) may be randomly selected as a reference node for inclusion in the subset L.

(2) Close—Any positioned node that is close to the subject node, according to some distance function (examples include, but are not limited to, geographic distance, network delay and network bandwidth) may be selected as a reference node for inclusion in the subset L. Several algorithms can be used to discover close nodes, some algorithms are described below (3) Hybrid—A subset L of positioned nodes are selected such that L includes one or more randomly selected positioned nodes and some reference nodes that are close to the subject node. In this case, $L=L_{random}+L_{close}$ (the union of one or more reference nodes selected according to the Random selection mode ($L_{random}$) and one or more reference nodes selected according to the Close selection mode ($L_{close}$).

In the Close and Hybrid selection modes discussed above, several algorithms may be used to discover nodes close to the subject node. One algorithm for finding nodes close to the subject node uses expanding ring IP multicast messages to ask close nodes to announce their presence. Another algorithm employs a physical link attachment (for example, but not limited to, wired communication links and wireless communication links) to contact close nodes.

Yet another algorithm uses successive coordinate refinements to find close nodes. In this algorithm, after an initial estimation of the subject node's coordinates using the random selection, for example, the coordinates of the subject node and the coordinates of the other positioned nodes are used to find nodes close to the subject node by computing its predicted distances to the other positioned nodes. This operation can be repeated several times by restarting it with a new set of reference nodes $L_{close}$, such that the size of $L_{close} \geq d+1$ and $L_{close}$ includes the positioned nodes that are predicted to be close (e.g., within a threshold distance or within a given distance range) to the subject node.

One particular algorithm, based on successive refinement of coordinates, proceeds as follows:

1. Each network node in the network maintains a record of a set of positioned nodes, called set N.
2. The subject node performs an initial estimation of its coordinates using a random selection mode or some other selection mode.
3. The subject node keeps a set K of known nodes, initialized with L and a set P of probed nodes, also initialized with L.
4. Thereafter the subject node sends its estimated coordinates to the closest node in set P, and the node that receives the coordinates replies with a set of M nodes selected from N, wherein the set of M nodes are the closest to the subject node according to the estimated distances.
5. Upon receiving the reply, the subject node adds the M returned nodes to set K and probes the network distance to a subset of the M returned nodes (the subset can be selected based on a number of criteria, for instance the predicted closest), adds the probed nodes to P and re-computes its coordinates based on the distances and coordinates of nodes in P.
6. Steps 4 and 5 are repeated while the closest node in set P was not yet contacted.
7. Thereafter, the subject node can optionally further probe distances to a subset of the predicted closest nodes in set K, add the probed nodes to set P, and re-compute its coordinates.
8. The subject node can optionally repeat this process, starting from a node picked randomly from set K.
9. The output from this algorithm is a subset $L_{closest}$ of set P that contains the X nodes of P that are closest to the subject node.

It should be noted that malicious nodes may introduce security problems by lying about their coordinates or interfere with distance measurements. However, the described system can ensure that distances are predicted accurately, despite the possible involvement of such malicious nodes. Because the estimation process can utilize more than d+1 reference nodes and because one or more of the nodes may be randomly chosen, it is possible to isolate and omit presumably maliciously introduced data. A security module utilizing the measured and coordinate distances may enhance the security and accuracy of the coordinate and distance estimations.

Figure 9:
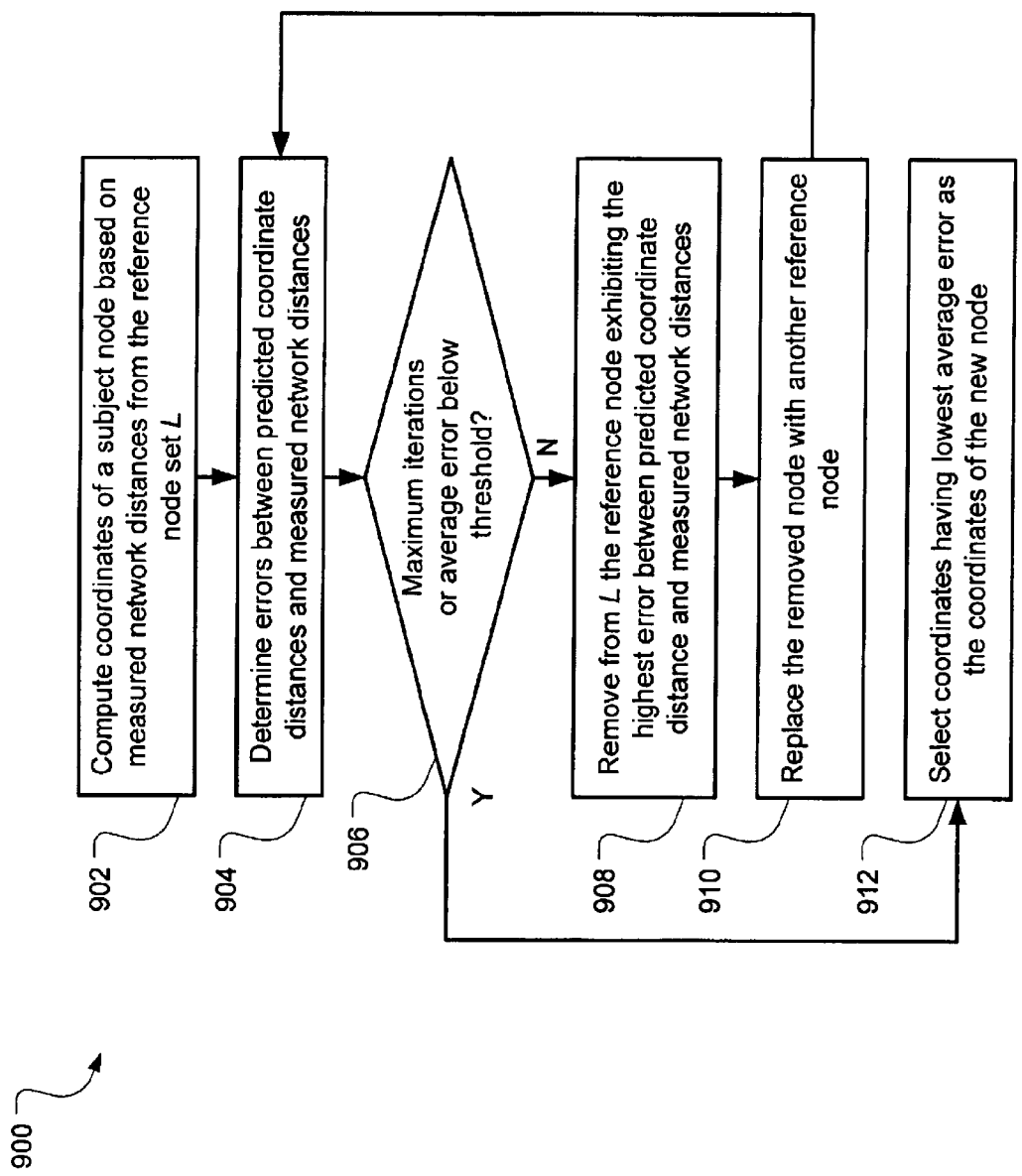
FIG. 9 illustrates operations of an exemplary secure network node coordinate estimation process.

FIG. 9 illustrates operations of an exemplary secure coordinate estimation process 900. A coordinate estimation operation 902 computes the coordinates of a subject node based on measured network distances between the subject node and the reference nodes in the subset L, such as by using the process described with regard to FIG. 2. A determining operation 904 calculates the errors between the predicted coordinate distances (i.e., the distances calculated based on the coordinates of the new node and the coordinates of the reference nodes) and the measured network distances.

A decision operation 906 determines whether the number of iterations in this security process has exceed a given iteration threshold or whether the average network distance error (as computed in determining operation 904 for this iteration) is below a given network distance error threshold.

If so, processing proceeds to a selection operation 912. Otherwise, a removal operation 908 removes from the network subset L the reference node exhibiting the highest error between the predicted coordinate distance and the measured network distance. This reference node is presumed to be malicious.

A replacement operation 910 replaces the removed node with another reference node, selected from the network. The new reference node may be selected randomly or based on a constraint. For example, referring to the description of the random, close, and hybrid modes, if the removed node was from the subset $L_{random}$, then the new reference node is selected randomly. Likewise, if the removed node was from the subset $L_{close}$, then another close unused reference node is selected as the new reference node in the subset L. Processing then loops back to the coordinate estimation operation 902 using the newly modified subset L.

In an alternative embodiment, the replacement operation 910 may be omitted. For example, if enough (i.e., $\geq d+1$) reference nodes remain after removing the malicious node, the coordinates of the subject node may be estimated using the remaining nodes.

The selection operation 912 selects the coordinates (computed in coordinate estimation operation 902 over all iterations) having the lowest average error as the coordinates of the new node. If the decision operation 906 terminates the loop based on the average error being below the network distance error threshold, then the final estimated coordinates will have been generated in the last iteration. If the decision operation 906 terminates the loop based on the number of iterations, then any previous iteration may have generated the lowest network distance error; therefore, the coordinates yielding the lowest error from any iteration are selected.

Figure 10:
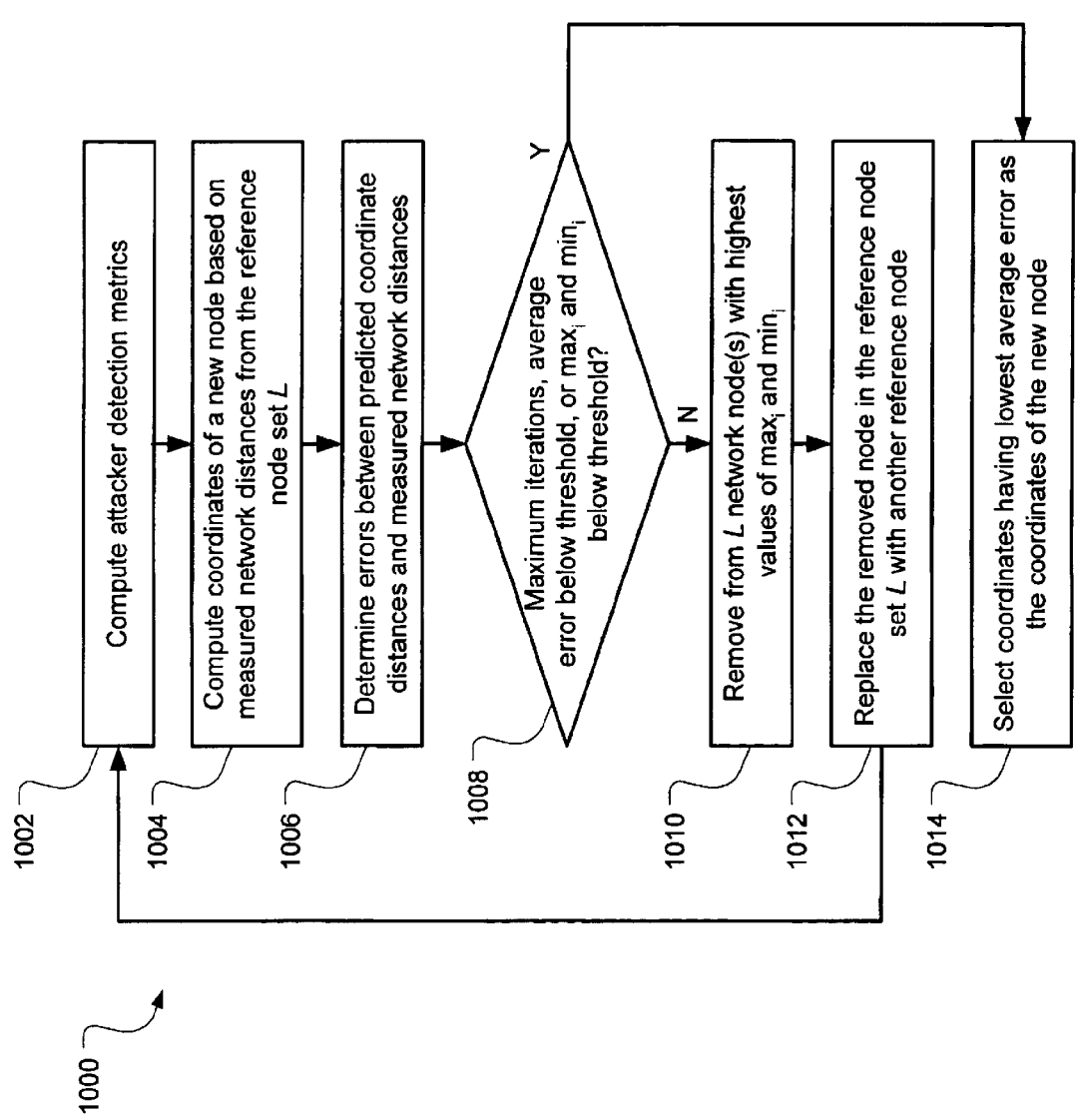
FIG. 10 illustrates operations of another exemplary secure network node coordinate estimation process.

FIG. 10 illustrates operations of another exemplary secure coordinate estimation process 1000. A metric computation operation 1002 computes attacker detection metrics for each reference node in the subset L. Although various metrics may be employed for this process, algorithms for computing exemplary attached detection metrics are listed below:

$$\max_i = \sum_{j=1}^{|L|} \begin{cases} d_{g,i}^m - (d_{g,j}^m + d_{i,j}^p) & \text{if } (d_{g,j}^m + d_{i,j}^p) < d_{g,i}^m \\ 0 & \text{otherwise} \end{cases} \quad (2)$$

$$\min_i = \sum_{j=1}^{|L|} \begin{cases} |d_{g,j}^m - d_{i,j}^p| - d_{g,i}^m & \text{if } |d_{g,j}^m - d_{i,j}^p| > d_{g,i}^m \\ 0 & \text{otherwise} \end{cases} \quad (3)$$

where $d_{g,i}^m$ represents the measured distance between the subject node g and the $i^{th}$ reference node in L, and $d_{i,j}^p$ represents the predicted coordinate distance computed between the $i^{th}$ and $j^{th}$ reference nodes in L. These metrics compute deviations from upper and lower bounds derived from triangular inequality relations.

A coordinate estimation operation 1004 computes the coordinates of a subject node based on measured network distances between the subject node and the reference nodes in the subset L, such as by using the process described with regard to FIG. 2. A determining operation 1006 calculates the errors between the predicted coordinate distances (i.e., the distances calculated based on the coordinates of the new node and the coordinates of the reference nodes) and the measured network distances.

A decision operation 1008 determines whether the number of iterations in this secure process has exceed a given iteration threshold, whether the average network distance error (as computed in determining operation 1006 for this iteration) is below a given network distance error threshold, or whether $\max_i$ and $\min_i$ are below one or more attacker detection metric thresholds. If not, processing continues to a removal operation 1002 to create a modified subset L. Otherwise, a selection operation 1014 selects the coordinates (computed in computing operation 1004 over all iterations) having the lowest average error as the coordinates of the new node. If the decision operation 1008 terminates the loop based on the average error being below the network distance error threshold or the $\max_i$ and $\min_i$ values being below the one or more attacker detection metric thresholds, then the final coordinates will have been generated in the last iteration. If the decision operations 1008 terminates the loop based on the number of iterations, then any previous iteration may have generated the lowest error; therefore, the coordinates yielding the lowest error from any iteration are selected.

The removal operation 1010 removes from L the reference node(s) having the highest values of $\max_i$ and $\min_i$. Note that more than one node having the highest value of $\max_i$ and more than one node having the highest value of $\min_i$ may be removed. A replacement operation 1012 replaces the removed node with another reference node. Under at least the same circumstances as previously discussed with regard to replacement operation 910 in FIG. 9, the replacement operation 1012 may be omitted. The new reference node may be selected randomly or based on a constraint. For example, referring to the description of the random, close, and hybrid modes, if the removed node was from the subset $L_{random}$, then the new reference node is selected randomly. Likewise, if the removed node was from the subset $L_{close}$, then another close unused reference node is selected as the new reference node.

As noted herein, estimated coordinates of nodes within the network may be dynamically refined (e.g., re-estimated) as conditions in the network change. In some implementations, refinement of node coordinates may be accomplished by rerunning the estimation process using the original members of the subset L, with new reference nodes being added to the original members of the subset L, with new reference nodes replacing some or all of the original members of the subset L, or any combination thereof. Triggers for such refinements may include without limitation a time-based trigger (e.g., based on the time since the coordinates were last calculated), a trigger based on inclusion of the given node in another subject node's subset L, detection of a new node in the network (e.g., a new node may broadcast its arrival to the other nodes in the network or to some dedicated "sentry" node) or a commanded trigger (e.g., when told to do so by another network node).

Refinement of coordinates may or may not be synchronized between network nodes. Synchronized refinement may correspond to any trigger event, including without limitation a trigger command relating to the subset L or some subset thereof.

A measure of network distance may violate triangular inequality, particularly when defined in reference to the round-trip delay between source and destination nodes. Likewise, network distance may be multi-dimensional, for example, representing both bandwidth and delay. Nevertheless the method described herein may still be applied with suitable adaptation, such as:

(1) by combining the measures into a single dissimilarity measure that represents the network distance; or
(2) by using weight vectors which weight the coordinates, as in Individual Difference Scaling—i.e., in a d-dimensional space, where $x_i$ represents the d-vector of coordinates for a positioned node i, the $k^{th}$ dissimilarity measure of the network distance $d_{ij}$ between overlay nodes i and j is approximated by $$d_{ij}^k \approx \sqrt{\sum_{m=1}^{d} w_{km}(x_{im} - x_{jm})^2}. \quad (4)$$

Figure 11:
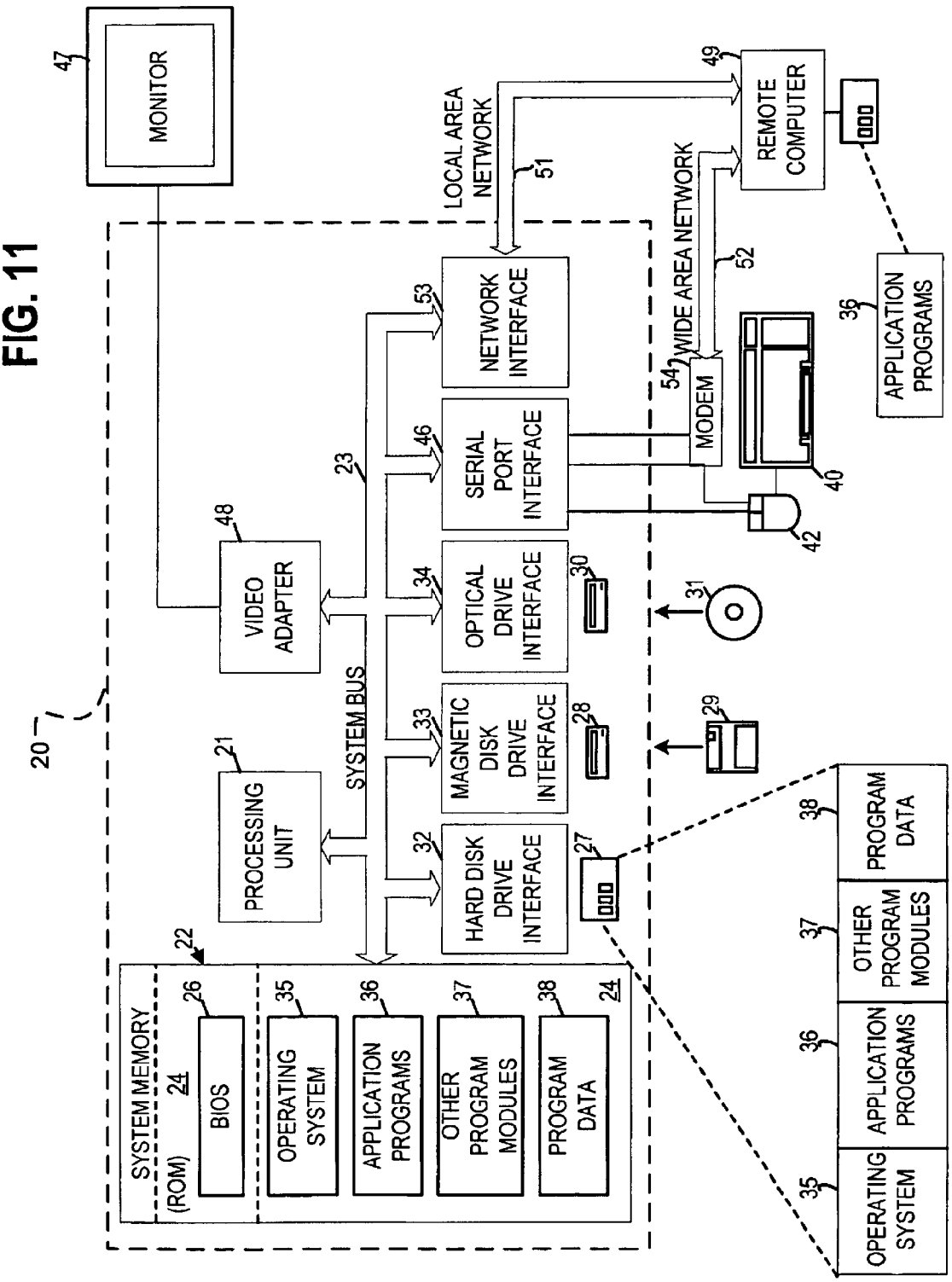
FIG. 11 illustrates an exemplary system useful for implementing an embodiment of the present invention.

The exemplary hardware and operating environment of FIG. 11 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network nodes, and typically includes many or all of the elements described above relative to the computer 20, although only a memory storage device 50 has been illustrated in FIG. 11. The logical connections depicted in FIG. 11 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, computation modules, decision modules, selection modules, or other modules may be incorporated as part of the operating system 35, application programs 36, or other program modules 37. The coordinates, thresholds, error values, and distances (both predicted and measured) may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method, implemented in a computing device, comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein computing comprises computing network distance errors between each measured network distance and a corresponding predicted coordinate distance, each predicted coordinate distance being based on tentative coordinates of the subject node and coordinates of one of the reference nodes.

2. The method of claim 1 further comprising:
measuring new measured network distances between a subject node and each reference node of a new plurality of reference nodes selected from the network; and
computing new coordinates in the coordinate space for the subject node based on the new measured network distances and the coordinates for each of the reference nodes in the new plurality of reference nodes.

3. The method of claim 1 further comprising:
receiving the coordinates for at least one of the reference nodes from the at least one reference node.

4. The method of claim 1 further comprising:
receiving the coordinates for at least one of the reference nodes from a different node in the network.

5. The method of claim 1 wherein measuring comprises:
measuring the measured network distances between the subject node and each of the reference nodes, wherein each of the reference nodes has been randomly selected from the network.

6. The method of claim 1 wherein measuring comprises:
measuring the measured network distances between the subject node and each of the reference nodes, wherein at least one of the reference nodes has been randomly selected from the network and at least one of the reference nodes is closer to the subject node than any other node in the network having designated coordinates.

7. The method of claim 1 wherein measuring comprises:
measuring the measured network distances between the subject node and each of the reference nodes, wherein at least one of the reference nodes has been randomly selected from the network and at least one of the reference nodes is within a predetermined network distance to the subject node.

8. The method of claim 1 wherein measuring comprises:
measuring the measured network distances between the subject node and each of the reference nodes based on measured round-trip delay times between the subject node and each of the reference nodes.

9. The method of claim 1 wherein further comprising:
computing an attacker detection metric based on each of the measured network distances and the coordinates for each of the reference nodes.

10. The method of claim 1 wherein further comprising:
estimating a network distance between the subject node and another positioned node by computing a coordinate distance between the coordinates of the subject node and coordinates of the other positioned node.

11. A method, implemented in a computing device, comprising:
measuring measured network distances between a subject node and each reference node of a plurality of reference nodes selected from a network, at least one reference node being randomly selected from the network, each reference node being designated by coordinates in a coordinate space; and
computing coordinates in the coordinate space for the subject node based on the measured network distances and the coordinates for each of the reference nodes, wherein computing comprises:

computing the coordinates of the subject node by minimizing network distance errors between each measured network distance and a corresponding predicted coordinate distance, each predicted coordinate distance being based on tentative coordinates of the subject node and coordinates of one of the reference nodes.

12. A method, implemented in a computing device, comprising:
measuring measured network distances between a subject node and each reference node of a plurality of reference nodes selected from a network, at least one reference node being randomly selected from the network, each reference node being designated by coordinates in a coordinate space; and
computing coordinates in the coordinate space for the subject node based on the measured network distances and the coordinates for each of the reference nodes, wherein computing comprises:
computing the coordinates of the subject node by iteratively minimizing network distance errors between each measured network distance and a corresponding predicted coordinate distance.

13. A method, implemented in a computing device, comprising:
measuring measured network distances between a subject node and each reference node of a plurality of reference nodes selected from a network, at least one reference node being randomly selected from the network, each reference node being designated by coordinates in a coordinate space; and
computing coordinates in the coordinate space for the subject node based on the measured network distances and the coordinates for each of the reference nodes, and
replacing a reference node of the plurality with a new reference node selected from the network, the replaced reference node exhibiting a greater error between the associated measured network distance and a corresponding predicted coordinate distance than any other reference node in the plurality.

14. A method, implemented in a computing device, comprising:
measuring measured network distances between a subject node and each reference node of a plurality of reference nodes selected from a network, at least one reference node being randomly selected from the network, each reference node being designated by coordinates in a coordinate space; and
computing coordinates in the coordinate space for the subject node based on the measured network distances and the coordinates for each of the reference nodes;
replacing a reference node of the plurality with a new reference node selected from the network to define a new plurality of reference nodes, the replaced reference node exhibiting a greater error between the associated measured network distance and a corresponding predicted coordinate distance than any other reference node in the plurality;
measuring measured network distances between the subject node and the new reference node; and
computing new coordinates for the subject node based on each of the measured network distances and coordinates for each reference node of the new plurality of reference nodes.

15. A method, implemented in a computing device, comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, computing an attacker detection metric based on each of the measured network distances and the coordinates for each of the reference nodes;

replacing a reference node of the plurality with a new reference node selected from the network to define a new plurality of reference nodes, the replaced reference node exhibiting a greater attacker detection metric than any other reference node in the plurality;

measuring measured network distances between the subject node and the new reference node; and computing new coordinates for the subject node based on each of the measured network distances and coordinates for each reference node of the new plurality of reference nodes.

16. A computer program product encoding a computer program for executing on a computer system a computer process, the computer process comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein computing comprises computing network distance errors between each measured network distance and a corresponding predicted coordinate distance, each predicted coordinate distance being based on tentative coordinates of the subject node and coordinates of one of the reference nodes.

17. The computer program product of claim 16 wherein the computer process further comprises:

measuring new measured network distances between a subject node and each reference node of a new plurality of reference nodes selected from the network; and computing new coordinates in the coordinate space for the subject node based on the new measured network distances and the coordinates for each of the reference nodes in the new plurality of reference nodes.

18. The computer program product of claim 16 wherein the computer process further comprises:

receiving the coordinates for at least one of the reference nodes from the at least one reference node.

19. The computer program product of claim 16 wherein the computer process further comprises:

receiving the coordinates for at least one of the reference nodes from a different node in the network.

20. The computer program product of claim 16 wherein measuring comprises:

measuring the measured network distances between the subject node and each of the reference nodes, wherein each of the reference nodes has been randomly selected from the network.

21. The computer program product of claim 16 wherein measuring comprises:

measuring the measured network distances between the subject node and each of the reference nodes, wherein at least one of the reference nodes has been randomly selected from the network and at least one of the reference nodes is closer to the subject node than any other node in the network having designated coordinates.

22. The computer program product of claim 16 wherein measuring comprises:

measuring the measured network distances between the subject node and each of the reference nodes, wherein at least one of the reference nodes has been randomly selected from the network and at least one of the reference nodes is within a predetermined network distance to the subject node.

23. The computer program product of claim 16 wherein measuring comprises:

measuring the measured network distances between the subject node and each of the reference nodes based on measured round-trip delay times between the subject node and each of the reference nodes.

24. The computer program product of claim 16 wherein the computer process further comprises:

computing an attacker detection metric based on each of the measured network distances and the coordinates for each of the reference nodes.

25. The computer program product of claim 16 wherein the computer process further comprises:

estimating a network distance between the subject node and another positioned node by computing a coordinate distance between the coordinates of the subject node and coordinates of the other positioned node.

26. A computer program product encoding a computer program for executing on a computer system a computer process, the computer process comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein computing comprises:

computing the coordinates of the subject node by minimizing network distance errors between each measured network distance and a corresponding predicted coordinate distance, each predicted coordinate distance being based on tentative coordinates of the subject node and coordinates of one of the reference nodes.

27. A computer program product encoding a computer program for executing on a computer system a computer process, the computer process comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein computing comprises:

computing the coordinates of the subject node by iteratively minimizing a network distance error between each measured network distance and a corresponding predicted coordinate distance.

28. A computer program product encoding a computer program for executing on a computer system a computer process, the computer process comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein the computer process further comprises:

replacing a reference node of the plurality with a new reference node selected from the network, the replaced reference node exhibiting a greater error between the associated measured network distance and a corresponding predicted coordinate distance than any other reference node in the plurality.

29. A computer program product encoding a computer program for executing on a computer system a computer process, the computer process comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein the computer process further comprises:

replacing a reference node of the plurality with a new reference node selected from the network to define a new plurality of reference nodes, the replaced reference node exhibiting a greater error between the associated measured network distance and a corresponding predicted coordinate distance than any other reference node in the plurality;

measuring measured network distances between the subject node and the new reference node; and computing new coordinates for the subject node based on each of the measured network distances and coordinates for each reference node of the new plurality of reference nodes.

30. A computer program product encoding a computer program for executing on a computer system a computer process, the computer process comprising:

measuring measured network distances between a subject node and each reference node of a plurality of reference nodes selected from a network, at least one reference node being randomly selected from the network, each reference node being designated by coordinates in a coordinate space; and computing coordinates in the coordinate space for the subject node based on the measured network distances and the coordinates for each of the reference nodes, wherein the computer process further comprises:

computing an attacker detection metric based on each of the measured network distances and the coordinates for each of the reference nodes;

replacing a reference node of the plurality with a new reference node selected from the network to define a new plurality of reference nodes, the replaced reference node exhibiting a greater attacker detection metric than any other reference node in the plurality;

measuring measured network distances between the subject node and the new reference node; and computing new coordinates for the subject node based on each of the measured network distances and coordinates for each reference node of the new plurality of reference nodes.

31. A method comprising:

computing coordinates of a subject node in a coordinate space based on coordinates of a plurality of reference nodes selected from a network;

replacing a reference node of the plurality with a new reference node selected from the network to define a new plurality of reference nodes, wherein the reference node with a greater error is replaced with the new reference node having a smaller measured error corresponding to a difference between a measured network distance and a predicted distance; and computing new coordinates of the subject node in the coordinate space based on coordinates of each reference node in the new plurality of reference nodes.

* * * * *